United States Patent Office 3,547,743
Patented Dec. 15, 1970

3,547,743
HEAT SEALING DEVICE WITH MEANS FOR MODERATING THE TEMPERATURE OF THE SEAL BOUNDARY
Alex Tunner, Vancouver, British Columbia, Canada, assignor to Canadian Industries Limited, Montreal, Quebec, Canada, a corporation of Canada
Filed June 24, 1968, Ser. No. 739,386
Claims priority, application Canada, June 30, 1967, 994,440
Int. Cl. B32b 31/20; B30b 15/34
U.S. Cl. 156—583    5 Claims

ABSTRACT OF THE DISCLOSURE

A device for heat-sealing plastic film having a heated sealer bar flanked by a heat-insulating member that presses against the surface of the film adjacent to the heat seal. The heat-insulating member causes a temperature gradient on the flank of the heat seal and provides a stronger seal. The device is suitable for heat sealing polyethylene.

---

This invention relates to a device for heat sealing plastic film.

Containers fabricated from plastic film are in common use for packaging materials such as fertilizer, peat moss, cement, etc. Such containers usually are in the form of bags fabricated by heat-sealing plastic film such as polyethylene film. The strength of these containers is dependent to a considerable extent upon the strength of the seals. The forming of strong heat seals is favoured by the avoidance of sharp temperature gradients in the film adjacent to the seal. The minimization of temperature gradients during heat-sealing can be achieved by employing moderate sealing temperatures maintained over relatively long periods of time. However, the low temperatures make sealing of thick films difficult and the long time interval employed results in a low sealing rate. Thus, for high speed sealing of thick film the use of high sealing temperatures is desirable, provided the weakening high temperature gradients adjacent to the seal can be avoided.

It has been found that strong high temperature heat seals can be formed between the surfaces of heat sealable plastic film if the film heat-sealing element is flanked by a heat-insulating member that presses against the film surface adjacent to the heat-sealing element. The flanking heat-insulating member provides an effective temperature gradient at the boundary or flank of the seal so that the film adjacent to the seal maintains its strength.

It is thus an object of this invention to provide a means for making strong high temperature seals between the surfaces of plastic film. Additional objects will appear hereinafter.

The heat-sealing device of this invention comprises a heat-sealing element adapted for pressing against the surface of film, said heat-sealing element being flanked by a heat-insulating member adapted for pressing against the surface of the film at a position adjacent to the position of said sealing element. The heat-sealing element may be a solid metal bar known in the art, or may be of low mass and high thermal conductance, as described in British application No. 28825/67. The metal surface of the sealer bar is prevented from sticking to the film surface by the use of an antisticking coating or interposed tape of material such as polytetrafluoroethylene.

The invention is illustrated in the accompanying drawings wherein

Figure 1:
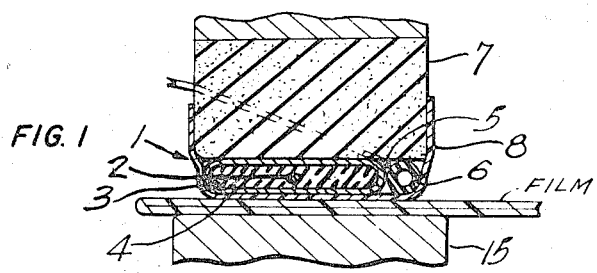
FIG. 1 is a diagrammatic cross section of the heat-sealing device.

Referring to FIG. 1, a heating element is shown generally at 1. This heat-sealing element is constituted by an electrical resistance element 2, ceramic insulation 3, and metallic jacket 4, which constitutes the element that transfers heat to the film. The heat-sealing element illustrated was prepared by flattening a length of 3/16 inch outer diameter Inconel jacketted heater wire having a Nichrome electrical resistance element. At 5 is indicated a thermocouple which is an element of the temperature control system. At 6 is shown a silicone rubber tube heat-insulating member which acts to moderate the heating of the film adjacent to the position of the seal. The heating element 1 and silicone rubber tube 6 are fastened to rigid heat insulating bar 7 by means of heat resistant tape 8 which may be made of polytetrafluoroethylene. Tape 8 serves also to prevent the film from sticking to the heat-sealing element. Bar 7 is attached to a bag making machine. 15 is an anvil against which the sealing device presses the film layers to be sealed.

It is to be understood that the heat-sealing device of the invention may be fabricated from materials other than those mentioned above. The heat-sealing element may be any of the heat-sealing members known in the art. The heat-sealing element may be of low mass and high thermal conductance. Likewise the silicone rubber tube heat-insulating member 6 may be replaced by other heat resistant flexible materials. The heat resistant tape enclosing both the heating element and the flexible heat insulating member way be of glass woven fabric, provided that it does not stick to hot film. It is necessary that the heating element and the flexible heat-insulating member be maintained in close proximity. It has been found that it is advantageous to have the surface of the flexible heat-insulating member protrude beyond the surface of the heating element so that the insulating member, during operation of the device, is the first to press against the film to be sealed.

A bag making machine may be equipped either with a single heat-sealing bar operating in conjunction with a matching anvil means, or with two matching heat sealing bars. In operation the heating element is maintained by a control means at a constant temperature which is higher than the melting point of the film to be sealed. Two or more sheets of the film to be sealed are placed in superposed position on a support beneath the sealing device. The sealing device is then pressed against the film for a predetermined period of time and removed. The heat-insulating member flanking the heating element is itself heated by the heat from the heating element and thus heats the flank of the seal to a lower temperature than the seal itself. There thus results a spatial gradation in temperature across the flank of the seal. It is also possible that the heat-insulating member restricts conduction of heat in the film itself.

A seal made by the device of this invention comprises an area where the film is fused together flanked on the side of the heat-insulating member by a region that has been subjected to a moderate temperature gradient and may be said to be annealed. On the side of the seal where no moderating of the heating took place, a sharp temperature gradient existed during sealing. It is observed that the film is substantially stronger on the side of the heat seal subject to moderate temperature gradients than on the side of the seal where sharp temperature gradients were present.

Figure 2:
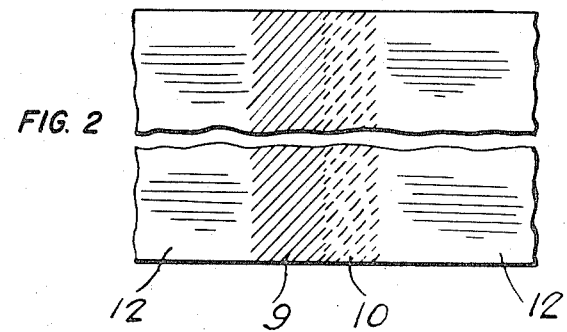
FIG. 2 is a diagrammatic plan view of a heat seal formed by the device of FIG. 1 between two sheets of polyethylene.

In FIG. 2 are illustrated some of the features of the heat seal made by the sealing device of FIG. 1. At 9 is shown the fused portion of the seal. This portion is flanked at 10 by a region that has been subjected to a moderate temperature gradient through the moderating action of the silicone tube 6. At 11 on the other flank of the seal a sharp temperature gradient existed during sealing. The unheated portion of the film is shown at 12. The distinction between film subjected to moderate and sharp temperature gradients can be seen by examination in polarized light using crossed polarizers. In polarized light a clear structural difference is shown.

Figure 3:
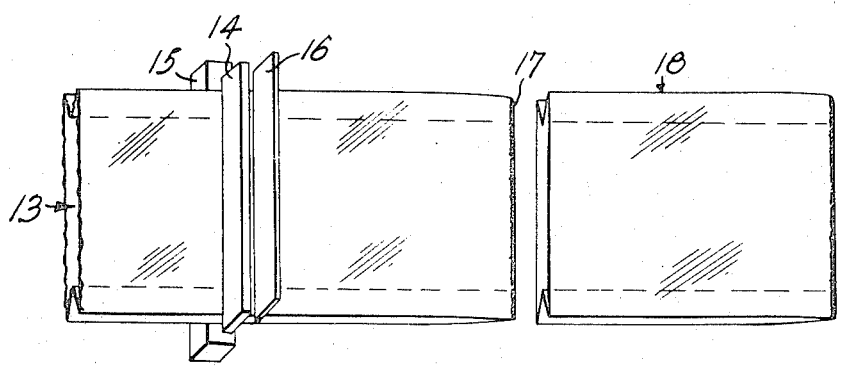
FIG. 3 is a diagrammatic view of the device of FIG. 1 in use in the fabrication of gusseted plastic bags.

The apparatus can be employed in conjunction with a known bag making machine of the type that advances a length of film intermittently in units of one bag length, the sealing and severing of the film taking place while the film is stationary. The sealing device is incorporated in the machine so that it compresses the film layers to be sealed against an anvil to form the seal. The use of the sealing device in making transversely sealed gusseted bags is illustrated in FIG. 3. The length of gusseted film is shown at 13. The sealing device is shown at 14 working against anvil 15 and flanked by blade 16 for severing the tubing adjacent to the seal. A finished seal is shown at 17. A completed bag is shown at 18.

As illustrated, the sealing device is adapted for the making of a seal with a strong flank on one side only. Such a seal is satisfactory for the external seams of a plastic bag wherein the strength of the external flank of the seal is not important. However, if the strength of both flanks of the seal is critical, heat-insulating members such as 6 in FIG. 1 will be used on both sides of the heating element.

The sealing device of this invention may be used for sealing both gusseted and non-gusseted plastic bags. With gusseted bags involving the sealing of four plies of film in the gusset portion, sealing times are necessarily longer than when only two-ply seals are to be made, for example 1.2 to 1.5 seconds for gusseted bags and 0.7 second for non-gusseted bags. However, a gusseted bag transverse seal involves the sealing of both four-ply and two-ply regions at the same time and it is in this requirement that the sealing device of this invention has an unexpected advantage. When the flexible heat-insulating member is adjusted to protrude above the surface of the heating element, it serves to limit the pressure of the heating element against the film to be sealed. Thus, in the four-ply section of a transverse seal in a gusseted bag, the multiple-ply seal can be made without overheating the film. It is believed that the heat-insulating member serves to limit extrusion of molten plastic from beneath the sealer bar. However, in the two-ply section of the transverse seal, the heating element does not press against the film the seal being made by the heated flexible heat-insulating member adjacent to the heating element. Thus, the sealing device accommodates both four-ply and two-ply seals in the single sealing operation. The flexible heat-insulating member also permits sealing across the folds of heavy gauge film without over-heating at the fold. The lower temperature heat-insulating member softens the film in the fold adjacent to position of the sealer bar thus avoiding the formation of holes adjacent to the fold seal.

Employing a sealing device of the type shown in FIG. 1 it is possible to heat-seal two-ply 7½ mil polyethylene film with strong seals in 0.7 second at 450° F. With solid metal sealer bars not flanked by heat-insulating members, good seals with this thickness of film can be made in 1.7 to 2.0 seconds when the temperature of the sealer bars is set at 300° F. to 350° F., this lower sealer bar temperature being required to avoid forming brittle seals.

EXAMPLE

Employing a sealing device of the design shown in FIG. 1, lay flat gusseted polyethylene tubing of 9-mil thickness and 18½ inches width and 14½ inches gussets was formed into six gusseted bags. The seals extended transversely across the polyethylene tubing, sealing both the central two-ply portion and the bordering four-ply gusset portions. Test strips ½ inch by 2 inches were cut transversely to the four-ply seal region and the two inner plies of the test strips were severed adjacent to the seal. This provided test strips of two plies of film attached at the seal. The two plies each had an annealed portion "A" that had been in contact with the rubber tube of the sealing device, and an unannealed portion "B" on the side of the seal adjacent to the side of the sealing bar not flanked by the rubber tube. In this manner test strips having either two "A" regions, or two "B" regions, separated by the seal, were provided.

Three annealed and three unannealed test strips from each of the six bags were tested according to ASTM D–1822–61T for tensile impact strength of the seal. The results are shown in the following table.

It is to be noted that the test strips from the annealed side of the seal average 2.9 times the strength of the test from the unannealed side of the seal. It is also to be noted that of the 18 annealed specimens, 15 failed by a film break and 2 by a seal break, whereas of the 18 unannealed specimens, 1 failed by a film break and 17 by seal breaks.

The very short dwell time required for sealing with the sealing device of this invention provides a means for increasing the rate of production of plastic bags. It has been found also that the apparatus is effective in sealing film having surface treating.

It has been found that the sealing device of the invention can be employed effectively to seal plastic film to solid thick plastic articles. This type of seal is required, as for example, when the solid moulded handle is attached to the upper plastic walls of a shopping bag. An analogous application is the sealing of plastic film covers on plastic food containers. If a standard heat-sealing bar is used in these applications it is found that the film adjacent to the seal has become wrinkled and may contain holes caused by melting of the thin wrinkled film adjacent to the hot sealing bar. This difficulty is believed to originate in the high temperature required to seal relatively thin film to much thicker plastic.

However, if the sealing device of the invention is fitted with a solid, inflexible heat-insulating member, disposed so that the heat-insulating member lies in contact with the film adjacent to the seal area, satisfactory seals can be effected without damaging the film. The heat-insulating member is believed to protect the film from the heat radiated by the hot heat-sealing element. The heat-insulating member itself becomes heated but to a lower temperature than that of the heat-sealing element, resulting, as in the case of a flexible heat-insulating member, in a temperature gradient at the boundary or flank of the seal.

Suitable materials for construction of the solid heat-insulating member are cement bonded asbestos or polytetrafluoroethylene.

closed and maintained in contact by a heat resistant flexible sheath.

TABLE.—TENSILE IMPACT TEST

| Sample No. | 1A | 1B | 2A | 2B | 3A | 3B |
|---|---|---|---|---|---|---|
| Bag No. 1: | | | | | | |
| Thickness (mils) | 9.0 | 8.9 | 8.6 | 8.7 | 8.1 | 8.4 |
| Strength (ft. lb.) | 8.10 F.B. | 2.40 S.B. | 9.20 F.B. | 1.44 S.B. | 5.10 F.B. | 1.80 S.B. |
| Bag No. 2: | | | | | | |
| Thickness (mils) | 8.9 | 8.7 | 8.4 | 8.4 | 8.2 | 8.2 |
| Strength (ft. lb.) | 5.10 F.B. | 1.70 F.B. | 4.85 S.B. | 1.50 S.B. | 3.0 F.B. | 2.0 S.B. |
| Bag No. 3: | | | | | | |
| Thickness (mils) | 9.0 | 8.9 | 8.6 | 8.7 | 8.1 | 8.4 |
| Strength (ft. lb.) | 8.10 F.B. | 2.40 S.B. | 9.20 F.B. | 1.44 S.B. | 5.10 F.B. | 1.80 S.B. |
| Bag No. 4: | | | | | | |
| Thickness (mils) | 9.2 | 8.9 | 8.4 | 8.6 | 7.9 | 8.2 |
| Strength (ft. lb.) | 5.20 F.B. | 1.80 S.B. | 5.25 S.B. | 1.60 S.B. | 3.40 F.B. | 2.00 S.B. |
| Bag No. 5: | | | | | | |
| Thickness (mils) | 8.8 | 9.2 | 8.6 | 8.8 | 8.4 | 8.4 |
| Strength (ft. lb.) | (1) | 1.65 S.B. | 4.60 F.B. | 2.60 S.B. | 3.95 F.B. | 2.10 S.B. |
| Bag No. 6: | | | | | | |
| Thickness (mils) | 8.8 | 9.3 | 8.5 | 8.8 | 8.1 | 8.2 |
| Strength (ft. lb.) | 5.5 F.B. | 2.05 S.B. | 4.05 F.B. | 1.80 S.B. | 3.9 F.B. | 2.20 S.B. |

[1] No break.
NOTE: F.B.=Film Break.
S.B.=Seal Break.
A=Annealed.
B=Unannealed.

What I claim is:

1. An apparatus for heat-sealing a plastic film to another plastic article which comprises a heat sealing bar and matching anvil, an elongated heat-insulating member of flexible material flanking said heat-sealing bar, both the heat-sealing bar and heat-insulating member being affixed to a rigid heat-insulating bar, the heat-sealing bar and heat-insulating member being adapted to contact the surface of the film at adjacent positions and to press the film and other plastic article against the anvil for heat-sealing.

2. An apparatus as claimed in claim 1 wherein the surface of the heat-insulating member protrudes beyond the surface of the heat-sealing bar whereby during the sealing operation the flexible insulating member presses against the film surface prior to the time of imposition of pressure by the heat-sealing bar.

3. An apparatus as claimed in claim 1 wherein the heat-sealing bar and the heat-insulating member are both enclosed and maintained in contact by a heat resistant flexible sheath.

4. An apparatus as claimed in claim 1 wherein the heat-sealing bar is heated electrically.

5. An apparatus as claimed in claim 1 wherein the heat-sealing bar is a metallic sealer bar coated with polytetrafluoroethylene.

References Cited

UNITED STATES PATENTS

| 2,904,100 | 9/1959 | Fener | 156—583 |
| 3,236,174 | 2/1966 | Hutchinson et al. | 156—583 |
| 3,291,963 | 12/1966 | Wetzel | 156—583X |

BENJAMIN A. BORCHELT, Primary Examiner

J. J. DEVITT, Assistant Examiner

U.S. Cl. X.R.

156—380